United States Patent
Min

(10) Patent No.: US 11,275,450 B2
(45) Date of Patent: Mar. 15, 2022

(54) FACEPLATES OF SWITCHING DEVICES HAVING PROGRAMMABLE FUNCTIONALITY MARKINGS AND METHODS OF USING THE SAME

(71) Applicant: NANJING EASTHOUSE ELECTRICAL CO., LTD., Nanjing (CN)

(72) Inventor: Hao Min, Nanjing (CN)

(73) Assignee: NANJING EASTHOUSE ELECTRICAL CO., LTD., Nanjing (CN)

( * ) Notice: Subject to any disclaimer, the term of this patent is extended or adjusted under 35 U.S.C. 154(b) by 0 days.

(21) Appl. No.: 17/016,069

(22) Filed: Sep. 9, 2020

(65) Prior Publication Data

US 2020/0409473 A1 Dec. 31, 2020

Related U.S. Application Data

(63) Continuation-in-part of application No. 15/022,204, filed on Mar. 15, 2016, now abandoned.

(51) Int. Cl.
*G06F 3/02* (2006.01)
*G09G 3/32* (2016.01)
*G09G 3/20* (2006.01)

(52) U.S. Cl.
CPC ......... *G06F 3/0202* (2013.01); *G09G 3/2003* (2013.01); *G09G 3/32* (2013.01); *G09G 2320/0666* (2013.01); *G09G 2354/00* (2013.01)

(58) Field of Classification Search
CPC ...... G06F 3/0202; G09G 3/32; G09G 3/2003; G09G 2320/0666; G09G 2354/00; H01H 9/181; H01H 9/18; H01H 9/165
See application file for complete search history.

(56) References Cited

U.S. PATENT DOCUMENTS 5,982,103 A * 11/1999 Mosebrook ............ H01Q 1/22
 315/149
2004/0036632 A1* 2/2004 Ford ...................... G06F 3/0238
 341/22

(Continued)

*Primary Examiner* — Premal R Patel
(74) *Attorney, Agent, or Firm* — Ming Jiang; MM IP Services LLC

(57) ABSTRACT

Present disclosure relates to a faceplate having programmable functionality markings for a switching device. The faceplate includes a functionality marking programmer, a functionality marking input interface, a functionality marking display and a circuit board. A user uses functionality marking programmer to designate switching device to a specific functionality with a corresponding functionality marking. The circuit board includes a control module. The control module includes a processor and a non-volatile memory storing an operating system and computer executable instructions, when executed at processor, computer executable instructions cause processor to: receive, from user through functionality marking input interface, functionality marking programming instructions, designate, by a functionality marking programmer, one of a set of functionality markings to the switching device according to the functionality marking programming instructions received from the functionality marking input interface, and display, by the functionality marking display on the faceplate, the programmed functionality marking of the switching device.

18 Claims, 17 Drawing Sheets

(56) References Cited

U.S. PATENT DOCUMENTS

| | | | | |
|---|---|---|---|---|
| 2004/0178683 A1* | 9/2004 | Hermetz | ............... | G04G 15/00 |
| | | | | 307/141 |
| 2013/0030589 A1* | 1/2013 | Pessina | ................ | G05B 15/02 |
| | | | | 700/295 |
| 2015/0120000 A1* | 4/2015 | Coffey | ................... | H05B 47/19 |
| | | | | 700/13 |
| 2015/0228419 A1* | 8/2015 | Fadell | .................... | H05B 47/19 |
| | | | | 307/112 |
| 2016/0284209 A1* | 9/2016 | Sun | ....................... | G08C 17/02 |
| 2016/0292563 A1* | 10/2016 | Park | ................... | G06F 3/04883 |
| 2017/0017324 A1* | 1/2017 | O'Keeffe | ............. | G02B 6/0078 |
| 2017/0063426 A1* | 3/2017 | Daigle | ................. | H04W 12/06 |
| 2020/0344855 A1* | 10/2020 | Steiner | ................. | H05B 47/18 |
| 2020/0352009 A1* | 11/2020 | Smith | .................. | H05K 5/0026 |

\* cited by examiner

SIGNS OF HOUSEHOLD APPLIANCES

FACEPLATES OF SWITCHING DEVICES HAVING PROGRAMMABLE FUNCTIONALITY MARKINGS AND METHODS OF USING THE SAME

FIELD

The present invention generally relates to electrical switching system, and more particularly to a method and an apparatus for programming and using faceplates of switching devices having programmable functionality markings.

BACKGROUND

Switch plate is widely used on a switch to cover the switch itself and the switch is used to control various electrical appliances or lightings. As new electrical appliances and lightings become more and more popular, the walls of household or offices become more and more crowded with difference types of switches. For example, in a bathroom, there are roof lights, vanity lights, celling fans, ventilation fans, spotlights, spa or whirlpool and more, and each of these electrical appliances and lightings requires at least one switch. The switches for these electrical appliances and lightings are usually installed near the door or the entrance, so there may be several switches installed in one place. Without proper identifications, it is difficult to distinguish one switch from another. The lack of functionality markings causes confusions. Unless a user can memorize the location of each switch, more often than not, he/she has to turn each and every one of several switches to achieving his/her goal of turning on or off one of the lights or electrical appliances. Therefore, it is desirable to identify the functionality of a switch with functionality markings.

Therefore, a heretofore unaddressed needs still exist in the art to address the aforementioned deficiencies and inadequacies.

SUMMARY

In one aspect, the present disclosure relates to a faceplate having programmable functionality markings for a switching device. In certain embodiments, the faceplate includes an outside surface, and an inside surface. A circuit board is installed directly on the inside surface of the faceplate. The faceplate includes a functionality marking programmer, a functionality marking input interface and a functionality marking display. A user uses the functionality marking programmer to designate the switching device to a specific functionality with a corresponding functionality marking according to functionality marking programming instructions received from the functionality marking input interface. The functionality marking display is installed on the outside surface of the faceplate, and the functionality marking display displays one of a set of functionality markings of the switching device programmed by the functionality marking programmer. The circuit board includes a control module. The control module includes a processor and a non-volatile memory storing an operating system and computer executable instructions, when executed at the processor, the computer executable instructions cause the processor to: receive, from the user through the functionality marking input interface, functionality marking programming instructions, designate, by a functionality marking programmer, one of the set of functionality markings to the switching device according to the functionality marking programming instructions received from the functionality marking input interface, and display, by the functionality marking display on the faceplate, the programmed functionality marking of the switching device.

In certain embodiments, the circuit board includes the control module, and the control module includes the processor, and the non-volatile memory. The control module is electrically coupled to the functionality marking programmer for receiving the functionality marking programming instructions. The control module is also electrically coupled to the functionality marking display for displaying the programmed functionality marking.

In certain embodiments, the set of functionality markings includes at least one of: a set of signs shown on a display screen, and each of the set of signs represents one of the set of functionality markings; a set of symbols shown on a dial, and each of the set of symbols represents one of the set of functionality markings; a set of user-defined color patterns shown on a light emitting diode (LED) array, wherein each of the set of user-defined color patterns represents one of the set of functionality markings; and a set of user-defined distinctive colors shown on a multi-color LED, wherein each of the set of user-defined distinctive colors represents one of the set of functionality markings.

In certain embodiments, the set of signs includes graphical signs of appliances, icons, alphanumerical phrases, words, and numbers. The set of symbols includes graphical symbols of appliances, alphanumerical phrases, words, and numbers.

In certain embodiments, the functionality marking display includes at least one of: the display screen, the dial, the LED array, and the multi-color LED. The display screen includes at least one of an LED display screen, a liquid crystal display (LCD) screen, and an LED touchscreen display, and a LCD touchscreen display. The display screen displays the set of signs and each of the set of signs represents one of the set of functionality markings. The dial includes the set of symbols. The dial displays the set of symbols and each of the set of symbols represents one of the set of functionality markings. The LED array displays a set of user-defined colored patterns, and each of the set of user-defined colored patterns represents one of the set of functionality markings. The multi-color LED displays the set of user-defined distinctive colors, and each of the set of user-defined distinctive colors represents one of the set of functionality markings.

In certain embodiments, the functionality marking programmer includes: a functionality marking programming device, a functionality marking selection icon, a functionality marking programmer button, the dial, a push button with display, a functionality marking selection push button, and a pair of functionality marking selection push buttons.

In certain embodiments, the functionality marking programming device includes an application built-in. The user uses the functionality marking programming device to select one of the set of signs displayed on a display screen of the functionality marking programming device, and sends functionality marking programming instructions over a connection to the functionality marking input interface of the faceplate to designate the switching device to one of the set of functionality markings.

In certain embodiments, the connection between the functionality marking programming device and the functionality marking input interface includes: a wireless connection between the functionality marking programming device and the functionality marking input interface over a communication network, and a wired connection between the functionality marking programming device and the functionality marking input interface directly through a connecting cable.

The communication network includes at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network.

In certain embodiments, the functionality marking selection icon is positioned inside of a touch screen. The user touches the functionality marking selection icon to cycle though the set of signs, to select one of the set of signs displayed on the touch screen, and sends functionality marking programming instructions to the control module of the faceplate to designate the switching device to one of the set of functionality markings.

In certain embodiments, the functionality marking programmer button is positioned on the faceplate. The user presses the functionality marking programmer button to cycle though the set of signs, to select one of the set of signs displayed on the touch screen, and sends functionality marking programming instructions to the control module of the faceplate to designate the switching device to one of the set of functionality markings.

In one embodiment, the dial is placed behind and in parallel with the faceplate and the set of symbols are distributed on the surface of the dial and shown through a functionality marking display window. In another embodiment, the dial is placed through the functionality marking display window and is in perpendicular to the faceplate. The set of symbols are distributed on the edge of the dial and shown through the functionality marking display window. In yet another embodiment, the dial is a rotating knob having a round functionality marking display window on the front surface of the rotating knob. As the user turns the dial, the set of symbols is displayed on a functionality marking display window, and when the user sees a desired symbol to represent the switching device through the functionality marking display window, the user stops turning and the desired symbol is chosen to designate the switching device.

In one embodiment, the push button with display is positioned on the faceplate, and the push button with display includes the functionality marking display window. The user pushes the push button with display repeatedly to cycle though the set of signs, selects one of the set of signs displayed on the functionality marking display window, and sends functionality marking programming instructions to the control module of the faceplate to designate the switching device to one of the set of functionality markings.

In certain embodiments, the functionality marking selection push button is positioned on the faceplate having the LED array. The user pushes the functionality marking selection push button repeatedly to cycle though the set of user-defined colored patterns, selects one of the set of user-defined colored patterns displayed on the functionality marking display, and sends functionality marking programming instructions to the control module of the faceplate to designate the switching device to one of the set of functionality markings.

In one embodiment, the pair of functionality marking selection push buttons are positioned on the faceplate having a multi-color LED. A left arrow button is placed on the left side of the multi-color LED, and a right arrow button is placed on the right side of the multi-color LED. The user pushes the left arrow button to move down a list of the set of user-defined distinctive colors and pushes the right arrow button to move up the list of the set of user-defined distinctive colors, selects one of the set of user-defined distinctive colors displayed on the multi-color LED, and sends functionality marking programming instructions to the control module of the faceplate to designate the switching device to one of the set of functionality markings. In another embodiment, a push button is placed on the outside surface of the faceplate beside the multi-color LED. The user pushes the push button repeatedly to cycle though the set of user-defined distinctive colors, selects one of the set of user-defined distinctive colors displayed on the multi-color LED, and sends functionality marking programming instructions to the control module of the faceplate to designate the switching device to one of the set of functionality markings.

In certain embodiments, the switching device includes at least one of: a toggle switch, a rotary switch, a push button switch, a touch switch, a push switch, a pull switch, a rocker switch, a slide switch, a light sensing switch, a motion sensing switch, and an LCD touchscreen switch.

In another aspect, the present disclosure relates to a method of using a faceplate having programmable functionality markings for a switching device. In certain embodiments, the method includes:

installing, by a user, the faceplate having programmable functionality markings on the switching device;

receiving, from the user through a functionality marking input interface, functionality marking programming instructions;

designating, by a functionality marking programmer, one of a plurality of functionality markings to the switching device according to the functionality marking programming instructions received from the functionality marking input interface; and displaying, by a functionality marking display on the faceplate, the programmed functionality marking of the switching device.

These and other aspects of the present invention will become apparent from the following description of the preferred embodiment taken in conjunction with the following drawings and their captions, although variations and modification therein may be affected without departing from the spirit and scope of the novel concepts of the disclosure.

BRIEF DESCRIPTION OF THE DRAWINGS

The accompanying drawings illustrate one or more embodiments of the present invention, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
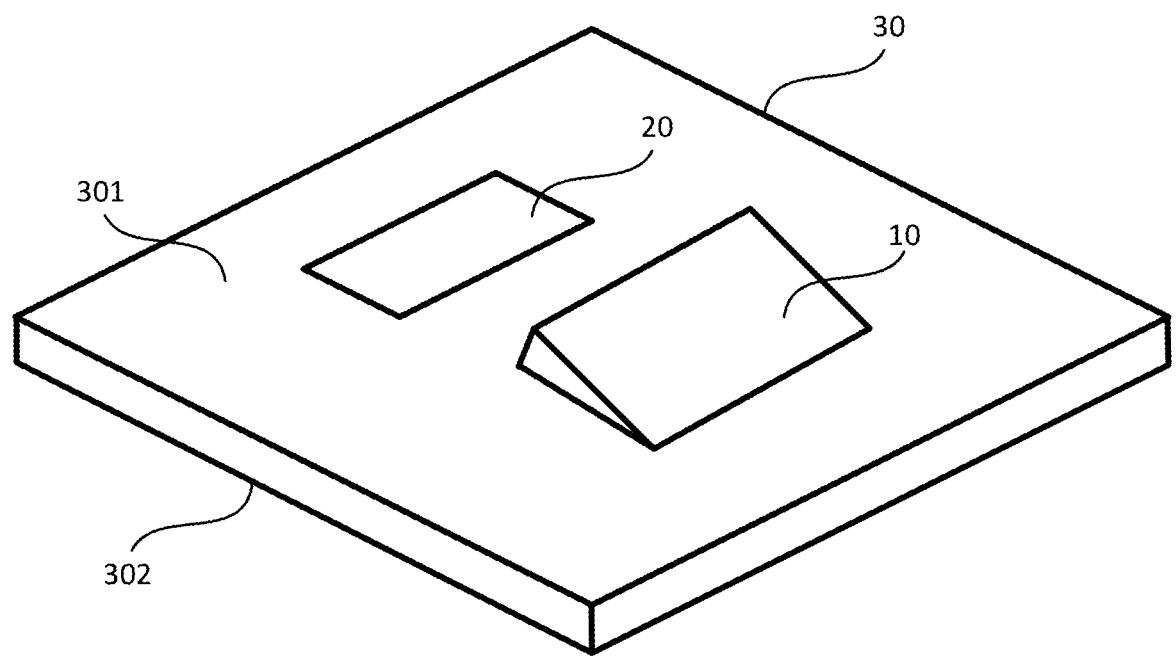
FIG. 1 shows a perspective view of a switching device with a faceplate having functionality marking according to certain embodiments of the present invention.

The present invention is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

Figure 16:
FIG. 16 is a related art showing a group of signs of household appliances.
Figure 17:
FIG. 17 is a related art showing a group of icons of household appliances.

As used herein, the term "functionality markings" are defined as identifiers to identify common house appliances such as a ceiling fan, a vanity light, a television set, an electrical stove as shown in related arts of FIGS. 16 and 17. Once a switching device for an appliance is installed and the switching device is designated with a functionality marking, the functionality marking is static and it will not change. The functionality markings do not reflect the state or the performance of the switching device or the appliance the switching device is controlling, such as: whether the switching device is turned on or off, the brightness of a light, and the speed of a ceiling fan etc. For example, if a switching device is used to control a ceiling fan, the functionality marking for this switching device may include a symbol of a ceiling fan, a sign of a ceiling fan, an icon of a ceiling fan, a phrase "Ceiling Fan", or a user-defined blue color LED light. The symbol, the sign, the icon, the phrase, or the user-defined blue color LED light only reflect what appliance the switching device is used to control, not whether the ceiling fan is on or off, the speed of the ceiling fan.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Figure 2:
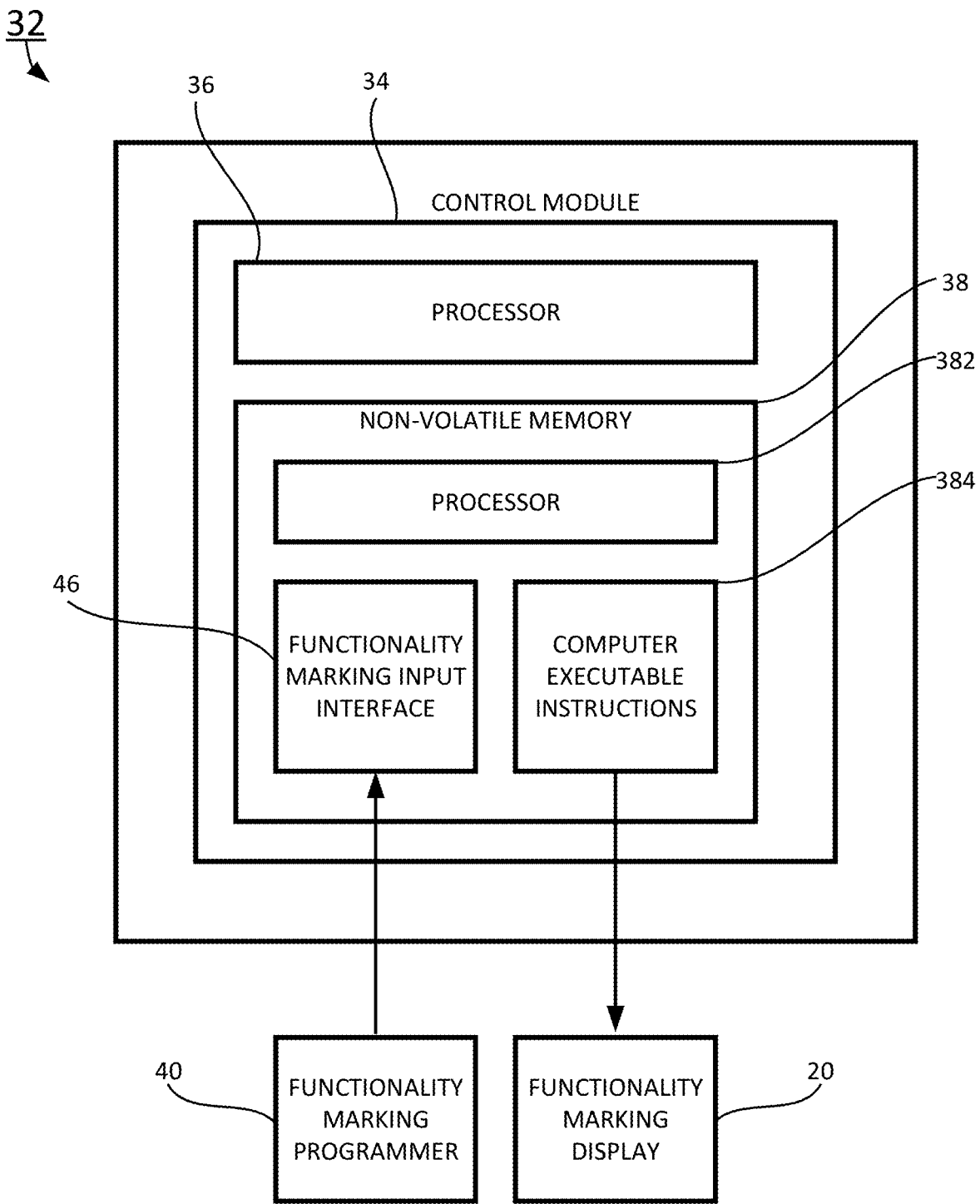
FIG. 2 shows a block diagram of a circuit board of the faceplate having functionality marking according to certain embodiments of the present invention.

In one aspect, as shown in FIG. 1, the present disclosure relates to a faceplate 30 having programmable functionality markings for a switching device 10. In certain embodiments, the faceplate 30 includes an outside surface 301, and an inside surface 302. A circuit board 32 is installed directly on the inside surface 302 of the faceplate 30. As shown in FIG. 2, the faceplate 30 includes a functionality marking programmer 40, a functionality marking input interface 46 and a functionality marking display 20. A user uses the functionality marking programmer 40 to designate the switching device 10 to a specific functionality with a corresponding functionality marking according to functionality marking programming instructions received from the functionality marking input interface 46. The functionality marking display 20 is installed on the outside surface 301 of the faceplate 30, and the functionality marking display 20 displays one of a set of functionality markings 27 of the switching device 10 programmed by the functionality marking programmer 40.

In certain embodiments, the circuit board 32 includes a control module 34. The control module 34 includes a processor 36 and a non-volatile memory 38 storing an operating system 382 and computer executable instructions 384. The control module 34 is electrically coupled to the functionality marking programmer 40 for receiving the functionality marking programming instructions. The control module 34 is also electrically coupled to the functionality marking display 20 for displaying the programmed functionality marking.

In certain embodiments, when executed at the processor 36, the computer executable instructions 384 cause the processor 36 to:

receive, from the user through a functionality marking input interface 46, functionality marking programming instructions;

designate, by a functionality marking programmer 40, one of the set of functionality markings 27 to the switching device 10 according to the functionality marking programming instructions received from the functionality marking input interface 46; and display, by the functionality marking display 20 on the faceplate 30, the programmed functionality marking of the switching device 10.

In certain embodiments, the set of functionality markings 27 includes at least one of: (a) a set of signs shown on a display screen, and each of the set of signs represents one of the set of functionality markings 27, (b) a set of symbols shown on a dial 29, and each of the set of symbols represents one of the set of functionality markings 27, (c) a set of user-defined color patterns shown on a light emitting diode (LED) array, and each of the set of user-defined color patterns represents one of the set of functionality markings 27, and (d) a set of user-defined distinctive colors shown on a multi-color LED, and each of the set of user-defined distinctive colors represents one of the set of functionality markings 27.

In certain embodiments, the set of signs includes graphical signs of appliances, icons of appliances, alphanumerical phrases identifying the appliances, words describing the appliances, and numbers defined by users representing the appliances. For example, when the switching device is used to control a coffee maker, in one embodiment, a sign such as the coffee maker as shown in a first on the left of the third row of FIG. 16, maybe used as a functionality marking to designate the switching device for the coffee maker. In another embodiment, an icon such as the coffee maker as shown in a first on the right of the first row of FIG. 17, maybe used as the functionality marking to designate the switching device for the coffee maker. In yet another embodiment, a simple phrase "Coffer Maker", or a user-defined number "1" may be used as the functionality marking to designate the coffee maker.

The set of symbols includes graphical symbols of appliances, alphanumerical phrases, words, and numbers. For example, when the switching device is used to control a washing machine, in one embodiment, a graphical symbol such as the washing machine as shown in a second on the left of the third row of FIG. 16, maybe used as a functionality marking to designate the washing machine. In another embodiment, an icon such as the coffee maker as shown in a second from the right of the second row of FIG. 17, maybe used as the functionality marking to designate the washing machine. In yet another embodiment, a simple phrase "Washing Machine", or a user-defined number "5" may be used as the functionality marking to designate the washing machine.

Figure 3:
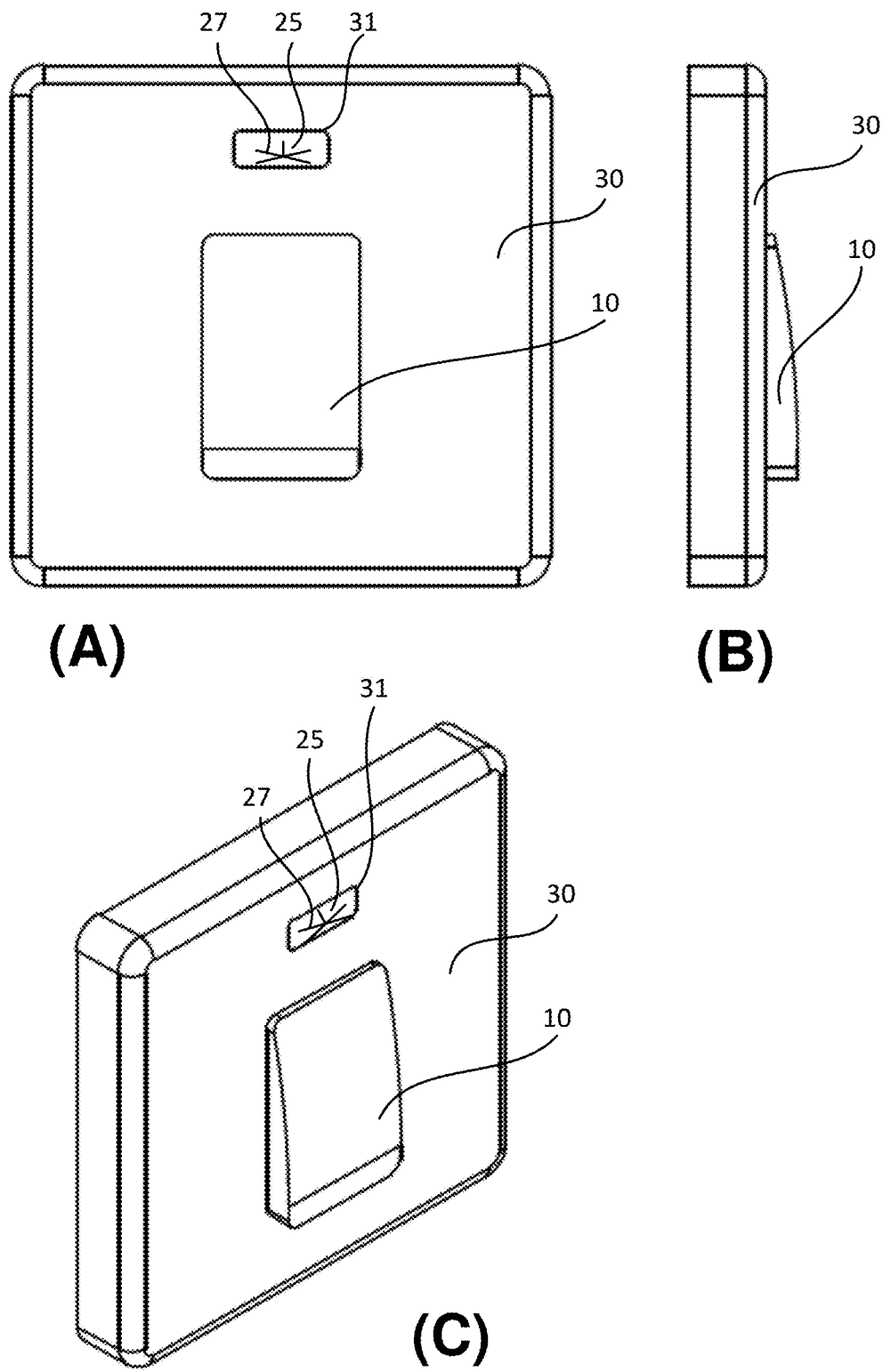
FIG. 3 shows a front view (A), a side view (B) and a perspective view (C) of an exemplary faceplate having a display screen showing functionality marking of the switching device according to one embodiment of the present invention.
Figure 4:
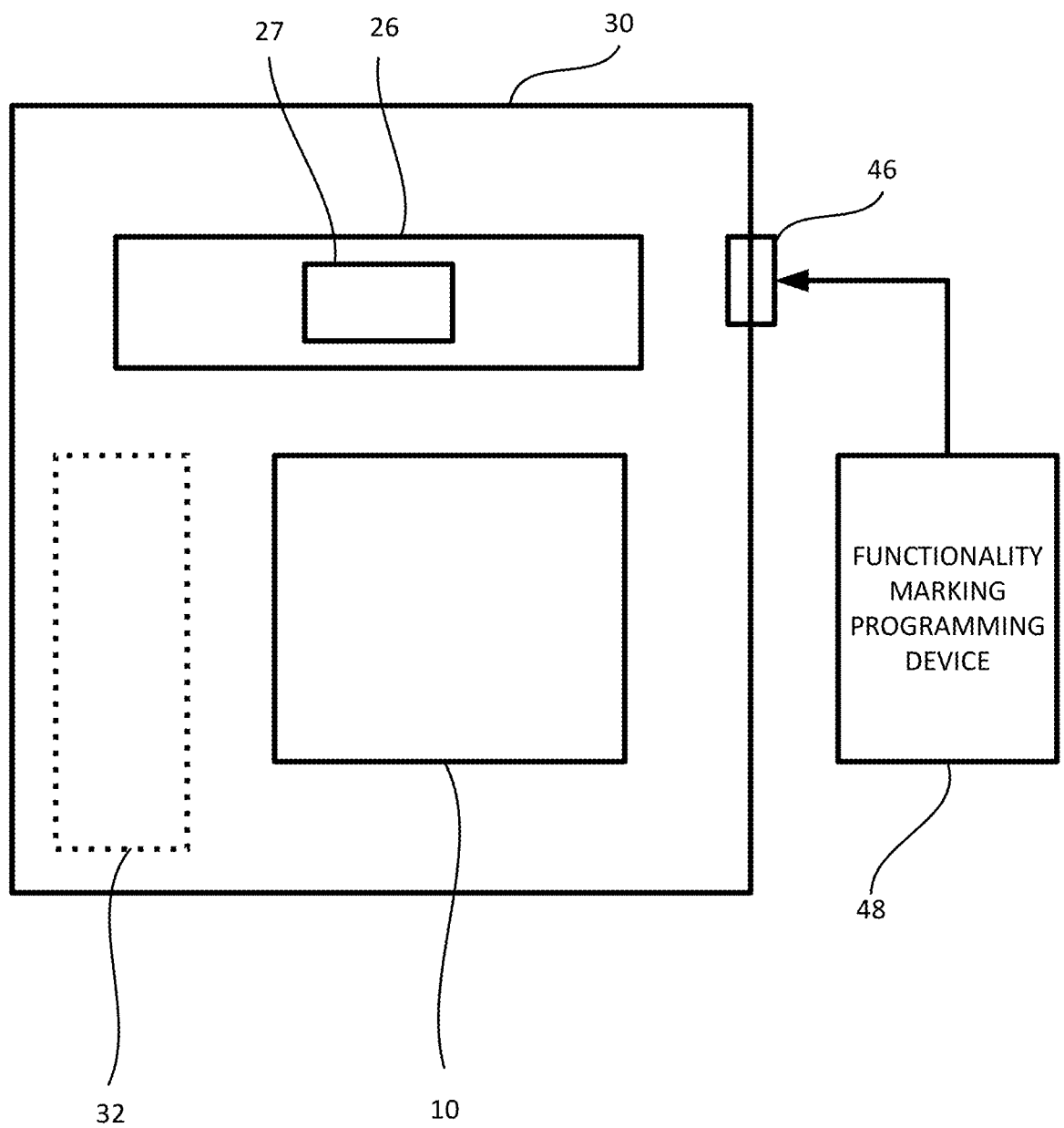
FIG. 4 shows a front view of an exemplary faceplate having a display screen showing functionality marking of the switching device, a functionality marking programming device connected to a functionality marking input interface and a circuit board inside of the faceplate according to one embodiment of the present invention.
Figure 5:
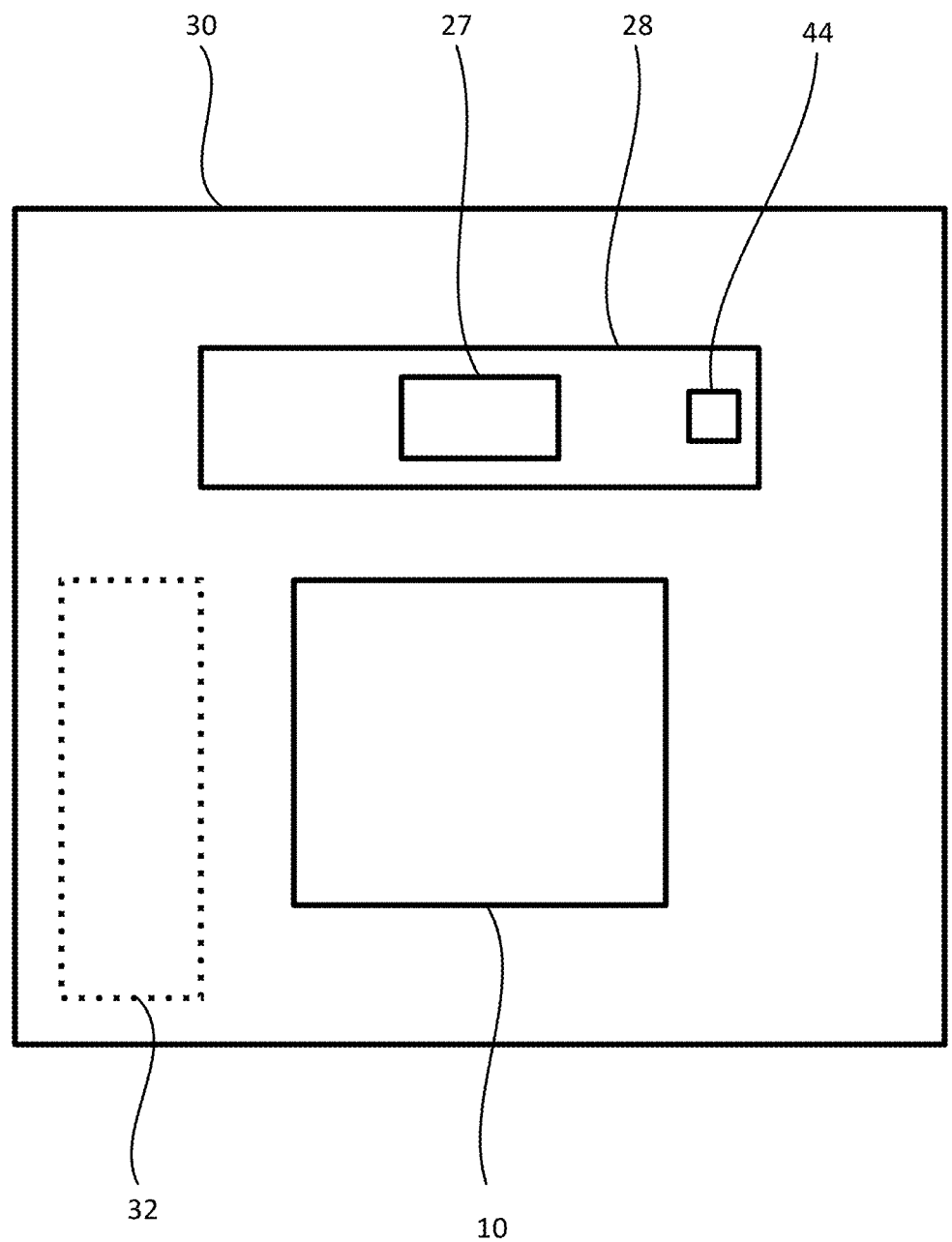
FIG. 5 shows a front view of an exemplary faceplate having a touch screen showing functionality marking of the switching device, and the circuit board inside of the faceplate according to one embodiment of the present invention.
Figure 6:
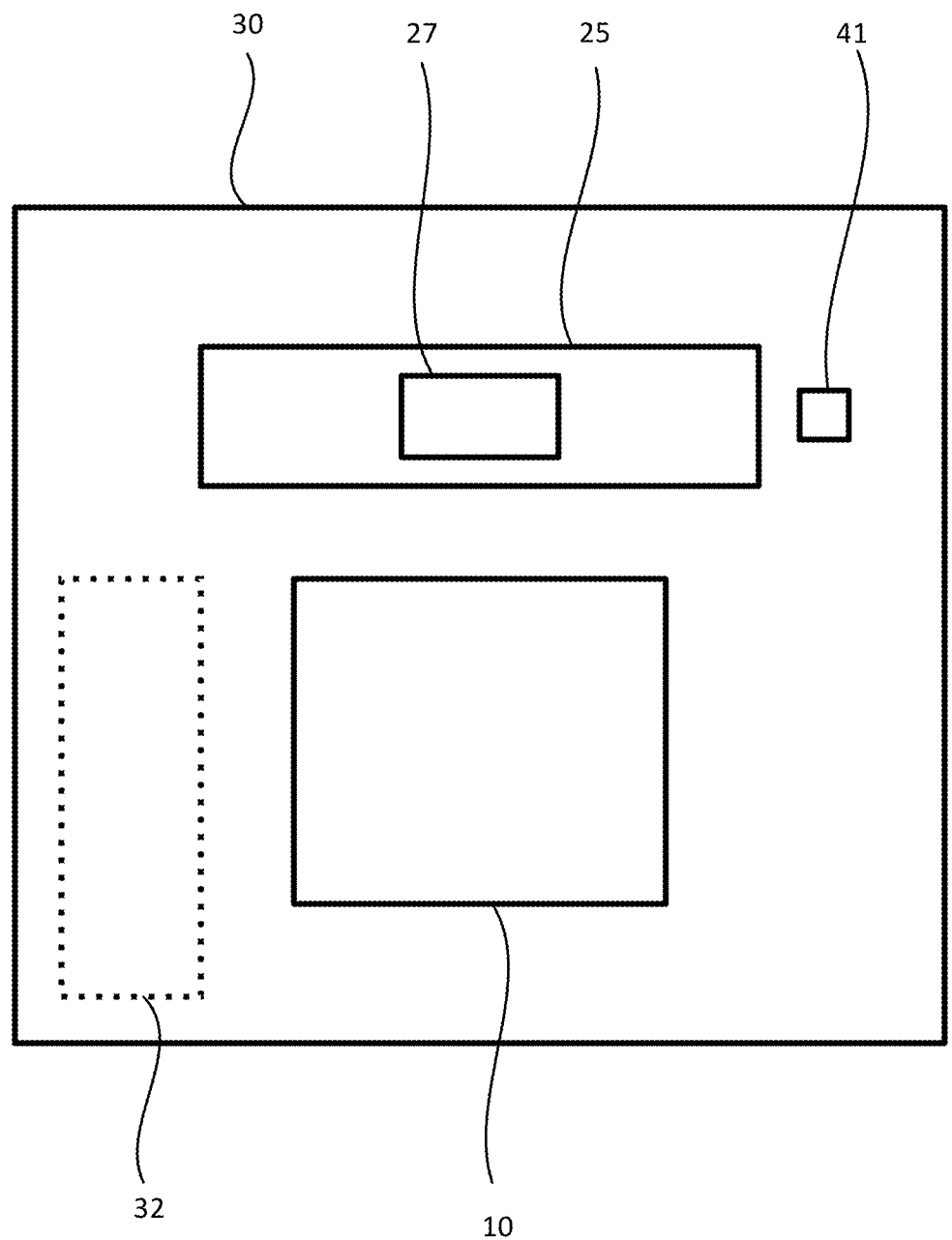
FIG. 6 shows a front view of an exemplary faceplate having an LED screen showing functionality marking of the switching device, a functionality marking programming button, and the circuit board inside of the faceplate according to one embodiment of the present invention.
Figure 7:
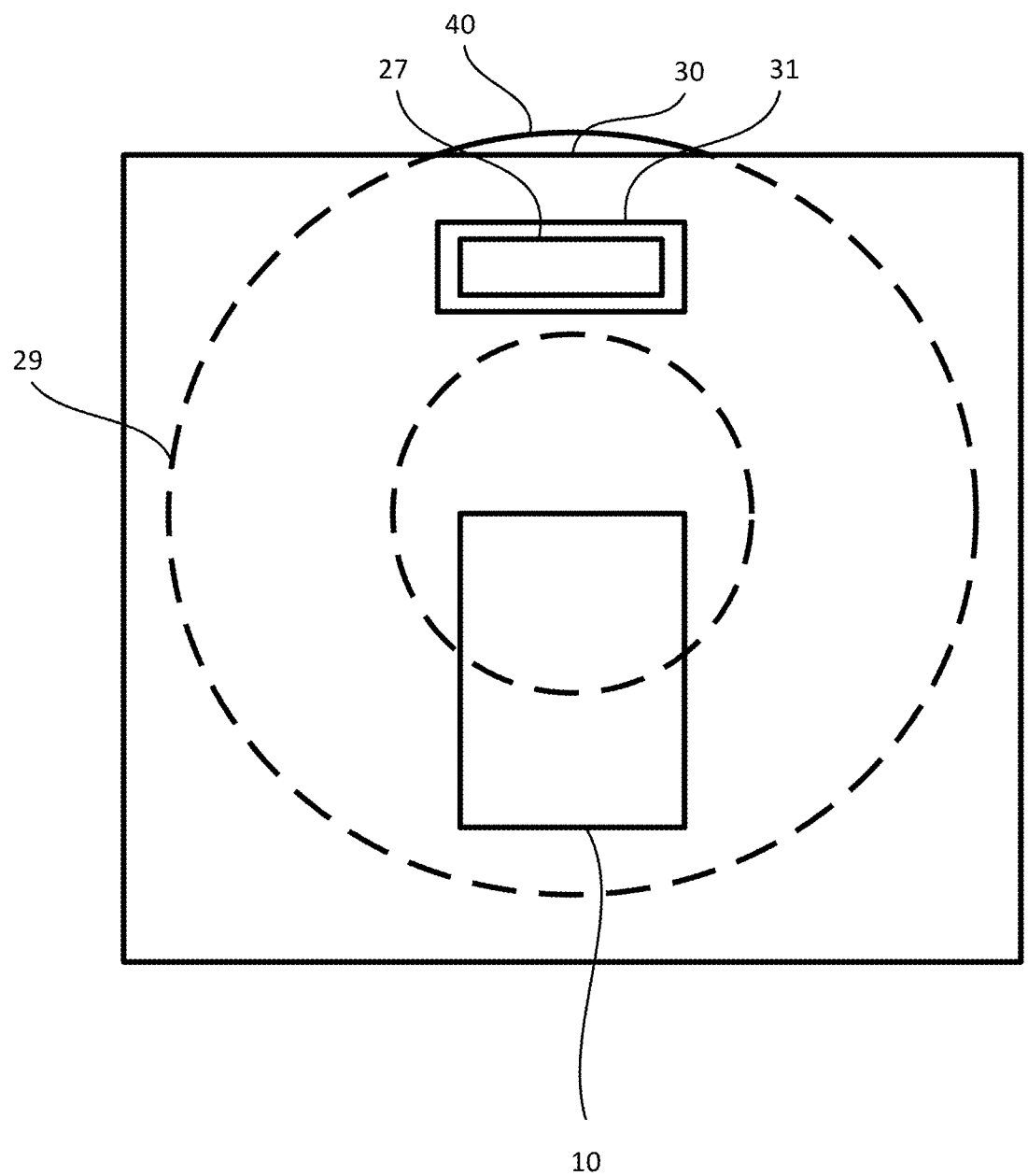
FIG. 7 shows a front view of an exemplary faceplate having a dial for selecting and showing functionality marking of the switching device according to one embodiment of the present invention.
Figure 8:
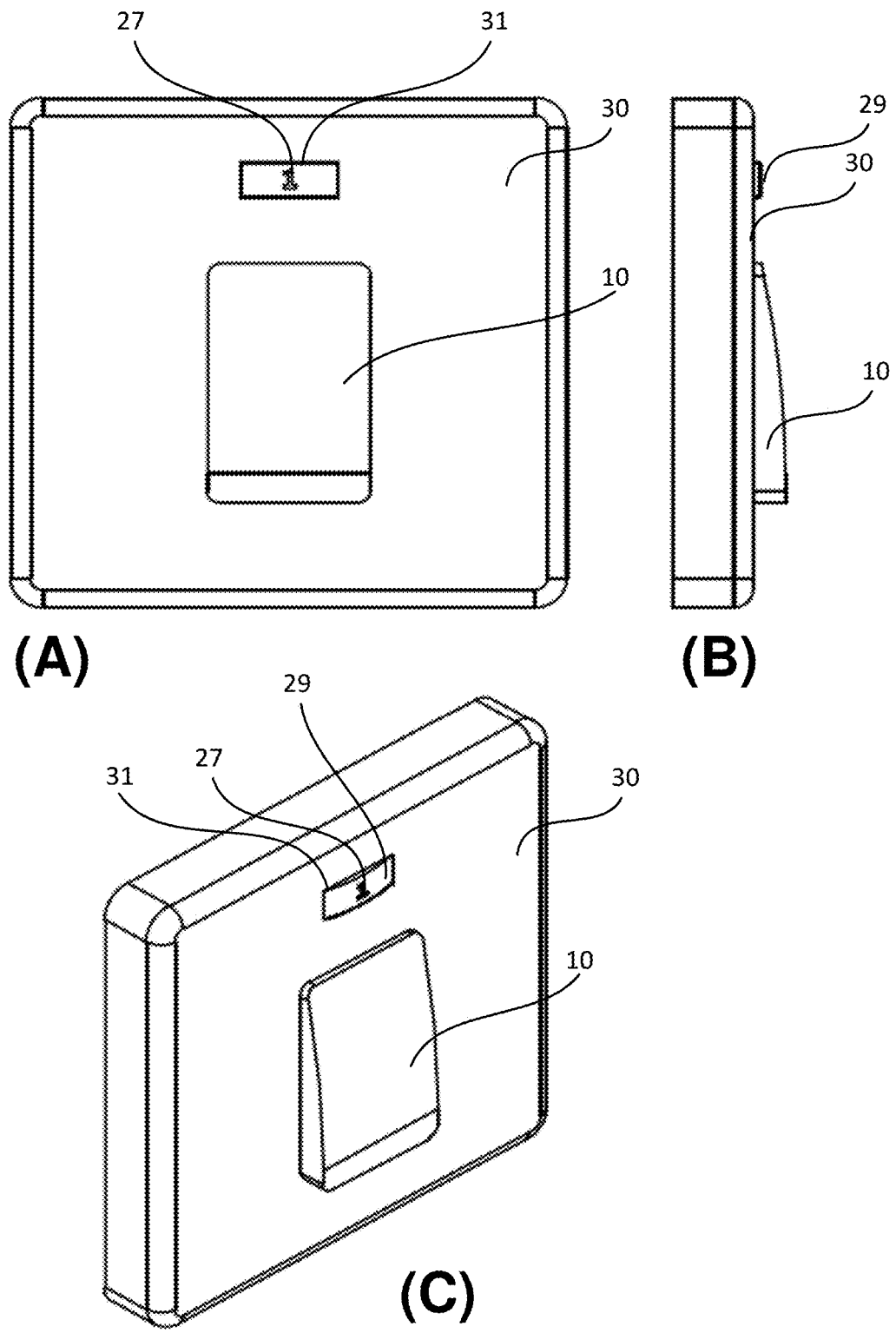
FIG. 8 shows a front view (A), a side view (B) and a perspective view (C) of an exemplary faceplate having a horizontal dial for selecting and showing functionality marking of the switching device according to one embodiment of the present invention.
Figure 9:
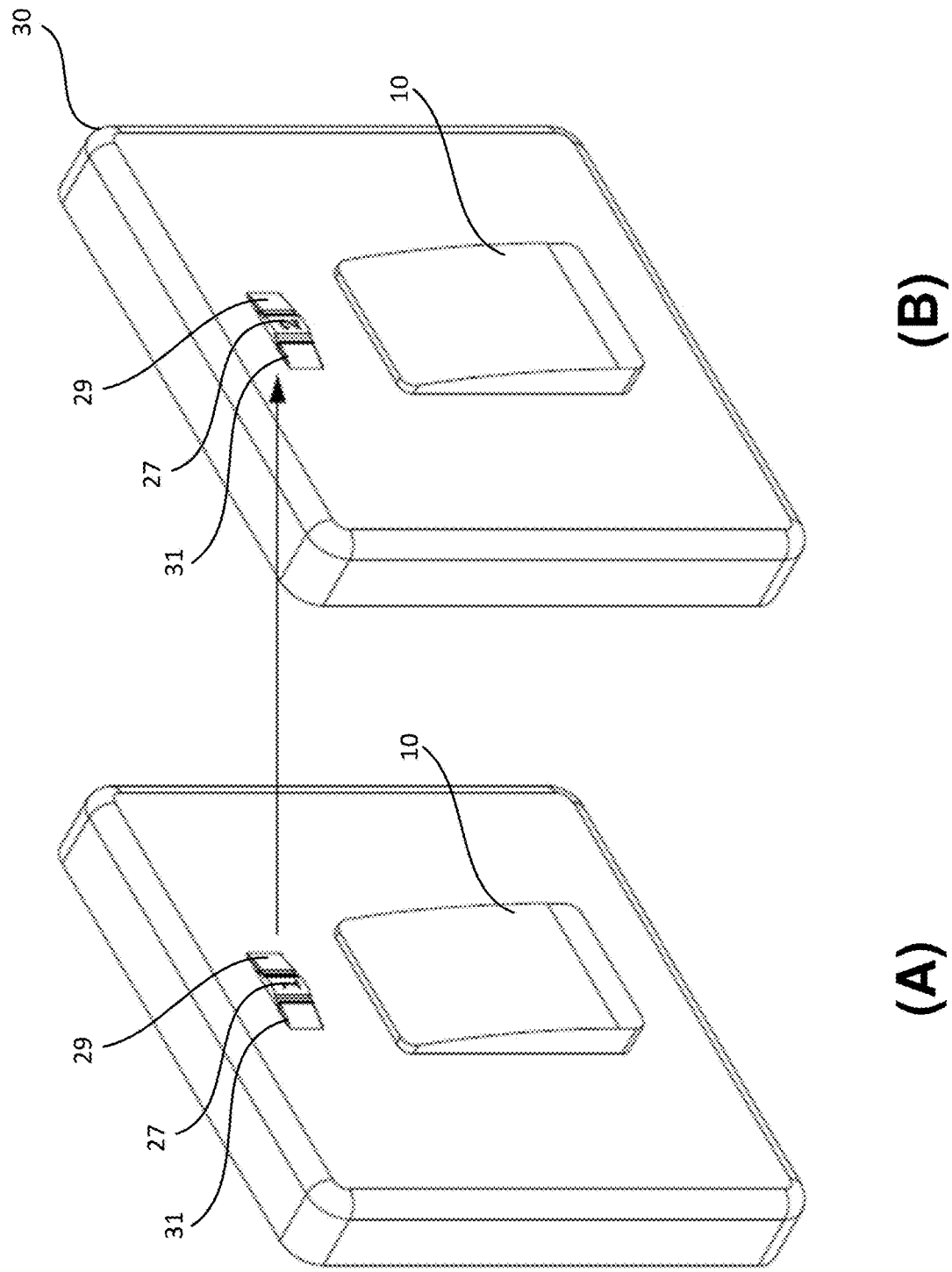
FIG. 9 shows a perspective view (A) of the faceplate having the horizontal dial before the user turns the horizontal dial, and a perspective view (B) after the user turns the horizontal dial according to one embodiment of the present invention.
Figure 12:
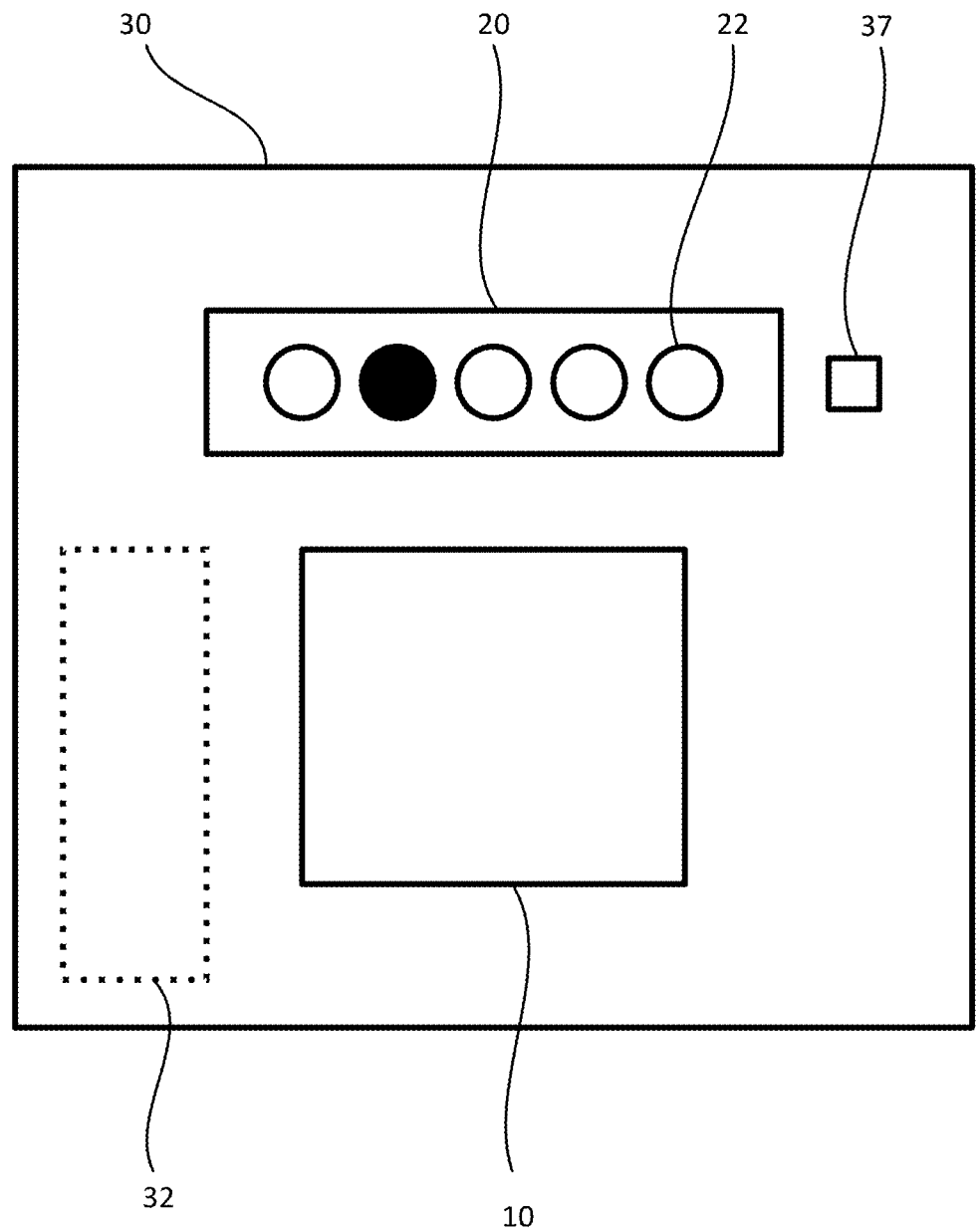
FIG. 12 shows a front view of an exemplary faceplate having an LED array and a functionality marking selection push button for selecting and showing user-defined color patterns as functionality markings according to one embodiment of the present invention.
Figure 13:
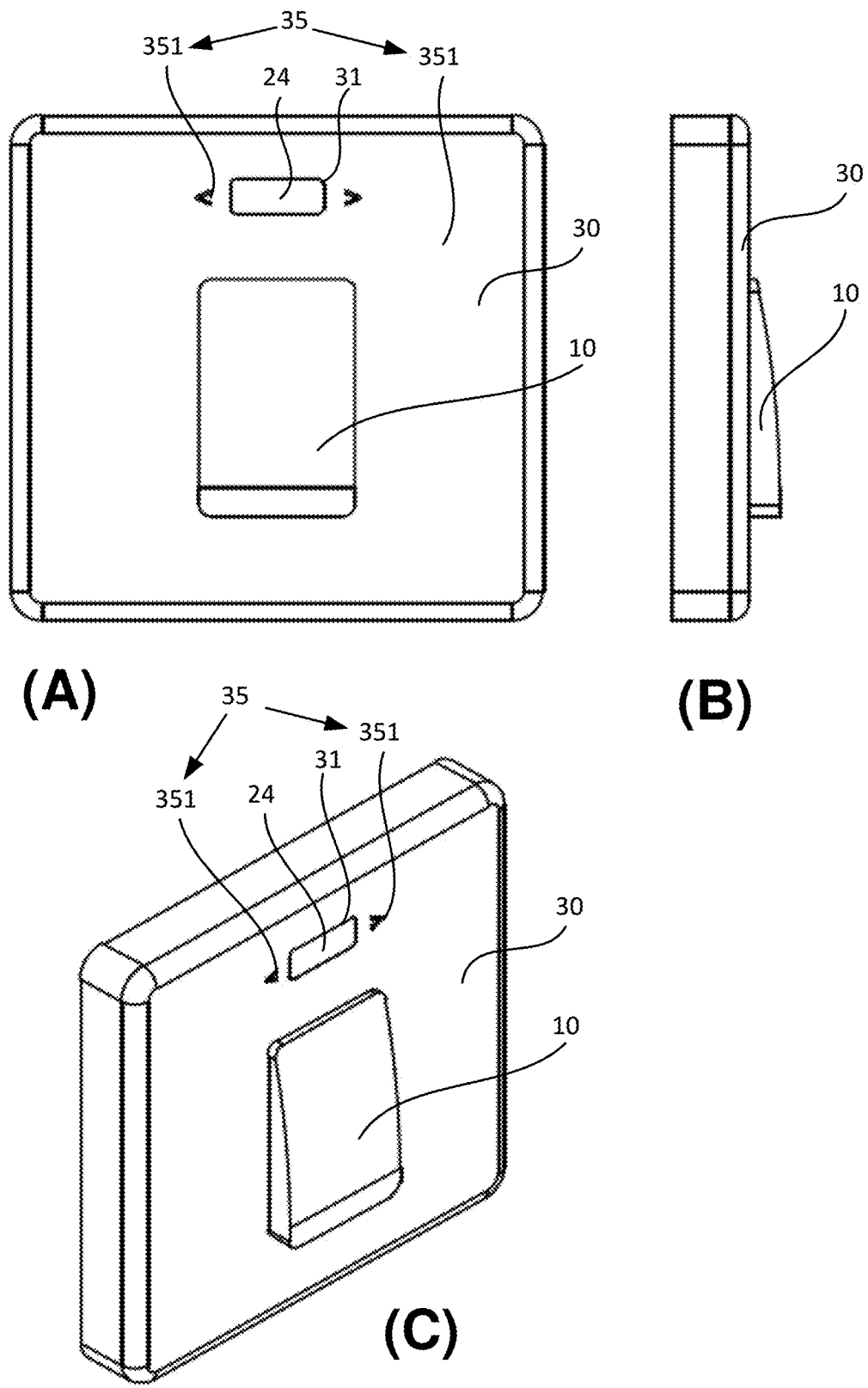
FIG. 13 shows a front view (A), a side view (B) and a perspective view (C) of an exemplary faceplate having a pair of functionality marking selection push buttons for selecting a user-defined distinctive color displayed on a multi-colored LED and showing the user-defined distinctive color as functionality marking of the switching device according to one embodiment of the present invention.
Figure 14:
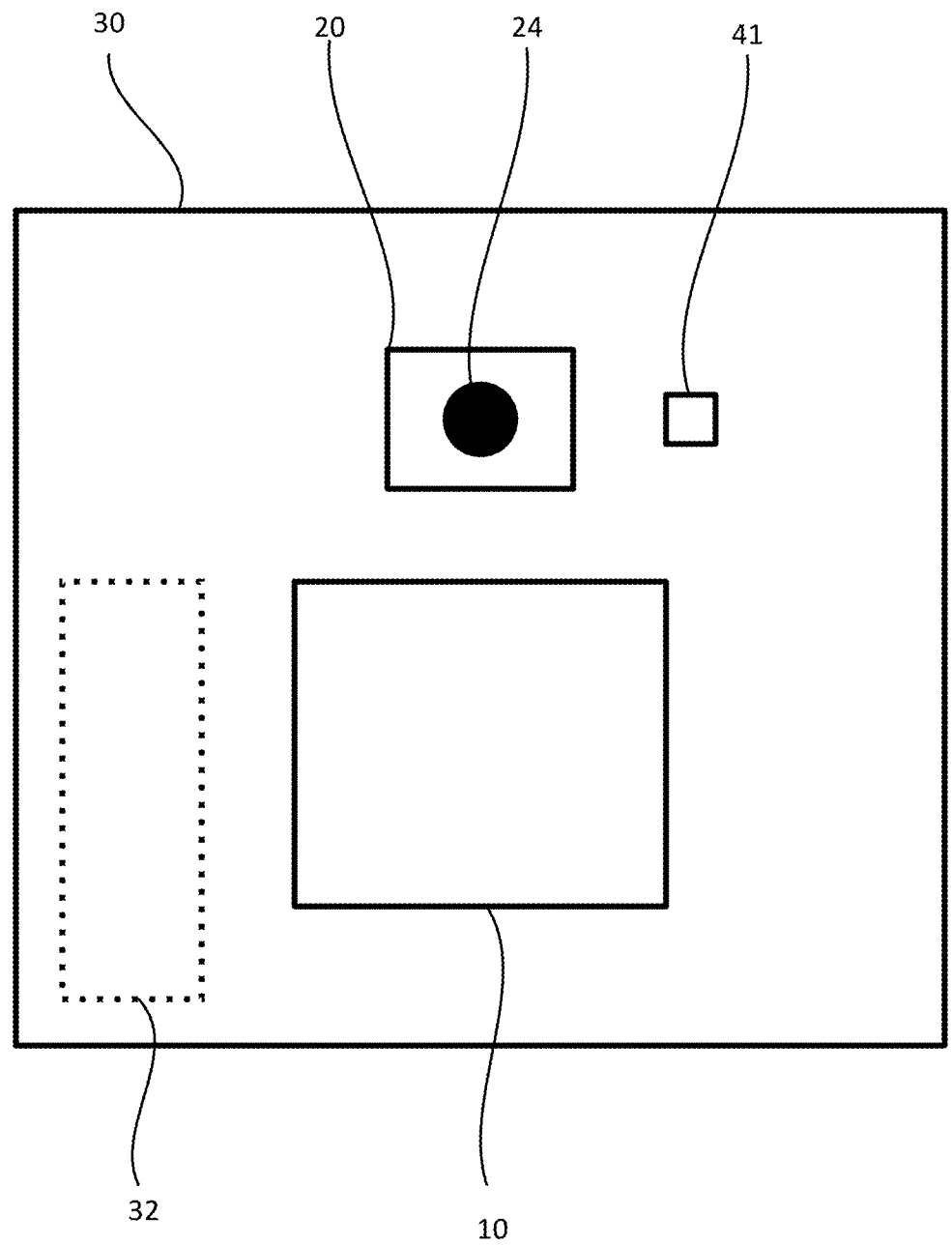
FIG. 14 shows a front view of an exemplary faceplate having a push button for selecting a user-defined distinctive color displayed on a multi-colored LED and the multi-colored LED showing the user-defined distinctive color as functionality marking of the switching device according to one embodiment of the present invention.

In certain embodiments, the functionality marking display 20 includes at least one of: the display screen as shown in FIGS. 3-6, a vertical dial 29 as shown in FIG. 7, a horizontal dial 29 as shown in FIGS. 8-9, a rotating knob dial 29 having a round functionality marking display window 31 on the front surface of the rotating knob, an LED array 22 as shown in FIG. 12, and the multi-color LED as shown in FIGS. 13-14. The display screen includes at least one of an LED display screen 25 as shown in FIG. 3 and FIG. 6, a liquid crystal display (LCD) screen 26 as shown in FIG. 4, and an LED or an LCD touchscreen display 28 as shown in FIG. 5. The display screen displays the set of signs and each of the set of signs represents one of the set of functionality markings 27. The dial 29 includes the set of symbols. The dial 29 displays the set of symbols and each of the set of symbols represents one of the set of functionality markings 27.

In certain embodiments, the LED array 22 displays a set of user-defined colored patterns, and each of the set of user-defined colored patterns represents one of the set of functionality markings 27. The multi-color LED displays the set of user-defined distinctive colors, and each of the set of user-defined distinctive colors represents one of the set of functionality markings 27.

Referring now to FIG. 3, a front view (A), a side view (B) and a perspective view (C) of an exemplary faceplate 30 having an LED display screen 25 showing functionality marking of the switching device is shown according to one embodiment of the present invention. In this embodiment, the LED display screen 25 is programmed to show a ceiling fan sign 27 as shown in the front view (A) and the perspective view (C). When the user wants to turn on the ceiling fan, the user will automatically look for this ceiling fan sign 27 and turn on the switching device 10 having this ceiling fan sign 27. He/she will not need to flip a few more switches to turn on the ceiling fan. The ceiling fan sign 27 will only designate the switching device 10 as a ceiling fan switch, and it will not show the state of the ceiling fan such as the speed of the ceiling fan or even the ceiling fan is on or off.

Referring now to FIG. 4, a front view of an exemplary faceplate 30 having a display screen showing functionality marking of the switching device 10, a functionality marking programming device 48 connected to a functionality marking input interface 46 and a circuit board 32 inside of the faceplate according to one embodiment of the present invention. In this embodiment, the functionality marking programmer 40 is the functionality marking programming device 48. In one embodiment, the functionality marking programming device 48 may be a handheld mobile communication device such as a smart phone. The smart phone includes a built-in application for the user to select one of the set of signs that represent available functionality markings to designate the appliance. The user uses the functionality marking programming device 48 to select one of the set of signs displayed on a display screen of the functionality marking programming device 48, and sends functionality marking programming instructions over a connection 49 to the functionality marking input interface 46 of the faceplate 30 to designate the switching device to one of the set of functionality markings 27.

In certain embodiments, the connection 49 between the functionality marking programming device 48 and the functionality marking input interface 46 includes: a wireless connection between the functionality marking programming device 48 and the functionality marking input interface 46 over a communication network, and a wired connection between the functionality marking programming device 48 the functionality marking input interface 46 directly through a connecting cable. The communication network includes at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network.

Referring now to FIG. 5, a front view of an exemplary faceplate 30 having a touch screen showing functionality marking of the switching device, and the circuit board inside of the faceplate are shown according to certain embodiments of the present invention. The functionality marking display is a touch screen 28. The touch screen 28 includes an LED touch screen and an LCD touch screen. A functionality marking selection icon 44 is displayed on the touch screen 28. The user taps the functionality marking selection icon 44 to cycle through the set of signs available with the faceplate 30, touches and holds the functionality marking selection icon 44 to select one of the set of signs 27 displayed on the touch screen 28, and sends functionality marking programming instructions to the functionality marking input interface 46 of the faceplate 30 to designate the switching device to one of the set of functionality markings 27.

Referring now to FIG. 6, a front view of an exemplary faceplate 30 having an LED screen showing functionality marking of the switching device, a functionality marking programming button 41, and the circuit board inside of the faceplate 30 is shown according to one embodiment of the present invention. In certain embodiments, the functionality marking programmer button 41 is positioned on the faceplate 30 having an LED display screen 25. The user taps the functionality marking programmer button 41 to cycle though the set of signs 27, presses and holds the functionality marking programmer button 41 to select one of the set of signs 27 displayed on the LED display screen 25, and sends functionality marking programming instructions to the control module 34 of the faceplate 30 to designate the switching device 10 to one of the set of functionality markings 27.

Referring now to FIG. 7, a front view of an exemplary faceplate 30 having a vertical dial 29 for selecting and showing functionality marking of the switching device 10 according to certain embodiments of the present invention. The vertical dial 29 may be a donut shape having a set of symbols 27 printed on the middle of the donut shape and along the circle of the donut shape such that the set of symbols 27 can be seen through the functionality marking display window 31. As the user turns the vertical dial 29, the set of symbols 27 is displayed through the functionality marking display window 31. When the user sees a desired symbol that represents the switching device 10 through the functionality marking display window 31, the user stops turning and the desired symbol is chosen to designate the switching device 10.

Referring now to FIG. 8, a front view (A), a side view (B) and a perspective view (C) of an exemplary faceplate 30 having a horizontal dial 29 for selecting and showing functionality marking of the switching device are shown according to one embodiment of the present invention. The horizontal dial 29 is placed through the functionality marking display window 31 and is in perpendicular to the faceplate 30. The set of symbols 27 is distributed on the edge of the horizontal dial 29 and shown through the functionality marking display window 31. Due to the thickness of the faceplate 30, the selection of the set of symbols 27 may be limited. In this embodiment, the set of symbols is alphanumerical character due to the size limitation. As shown in FIG. 9, a perspective view (A) of the faceplate 30 shows a number "1" before the user turns the horizontal dial 29. As the user turns the horizontal dial 29 to either left or right, perspective view (B) of the faceplate 30 shows a number "2" after the user turns the horizontal dial 29. The set of symbols 27 is displayed through the functionality marking display window 31. When the user sees a desired number (the number is user defined) that represents the switching device 10 through the functionality marking display window 31, the user stops turning and the desired number 27 is chosen to designate the switching device 10.

Figure 10:
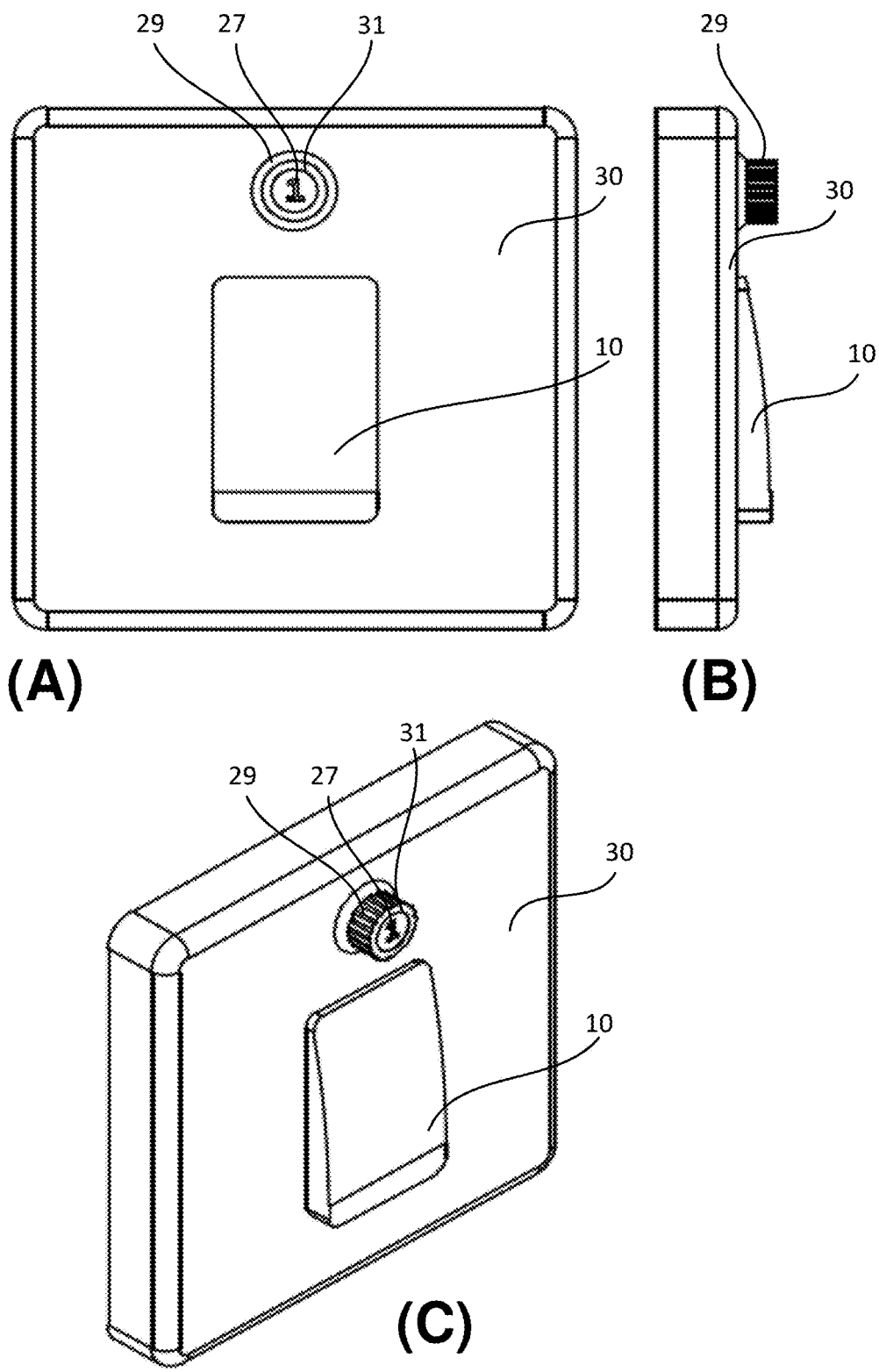
FIG. 10 shows a front view (A), a side view (B) and a perspective view (C) of an exemplary faceplate having a rotating knob dial for selecting and showing functionality marking of the switching device according to one embodiment of the present invention.

Referring now to FIG. 10, a front view (A), a side view (B) and a perspective view (C) of an exemplary faceplate 30 having a rotating knob dial 29 for selecting and showing functionality marking of the switching device are shown according to certain embodiments of the present invention. The rotating knob dial 29 includes a round functionality marking display window 31 on the front surface of the rotating knob dial 29. Due to the size of the round functionality marking display window 31, the size of the set of symbols 27 may be limited. As the user rotates the rotating knob dial 29 either to left or right, the set of available symbols 27 is displayed on the functionality marking display window 31, and when the user sees a desired symbol to represent the switching device 10 through the functionality marking display window 31, the user stops turning and the desired symbol is chosen to designate the switching device 10.

Figure 11:
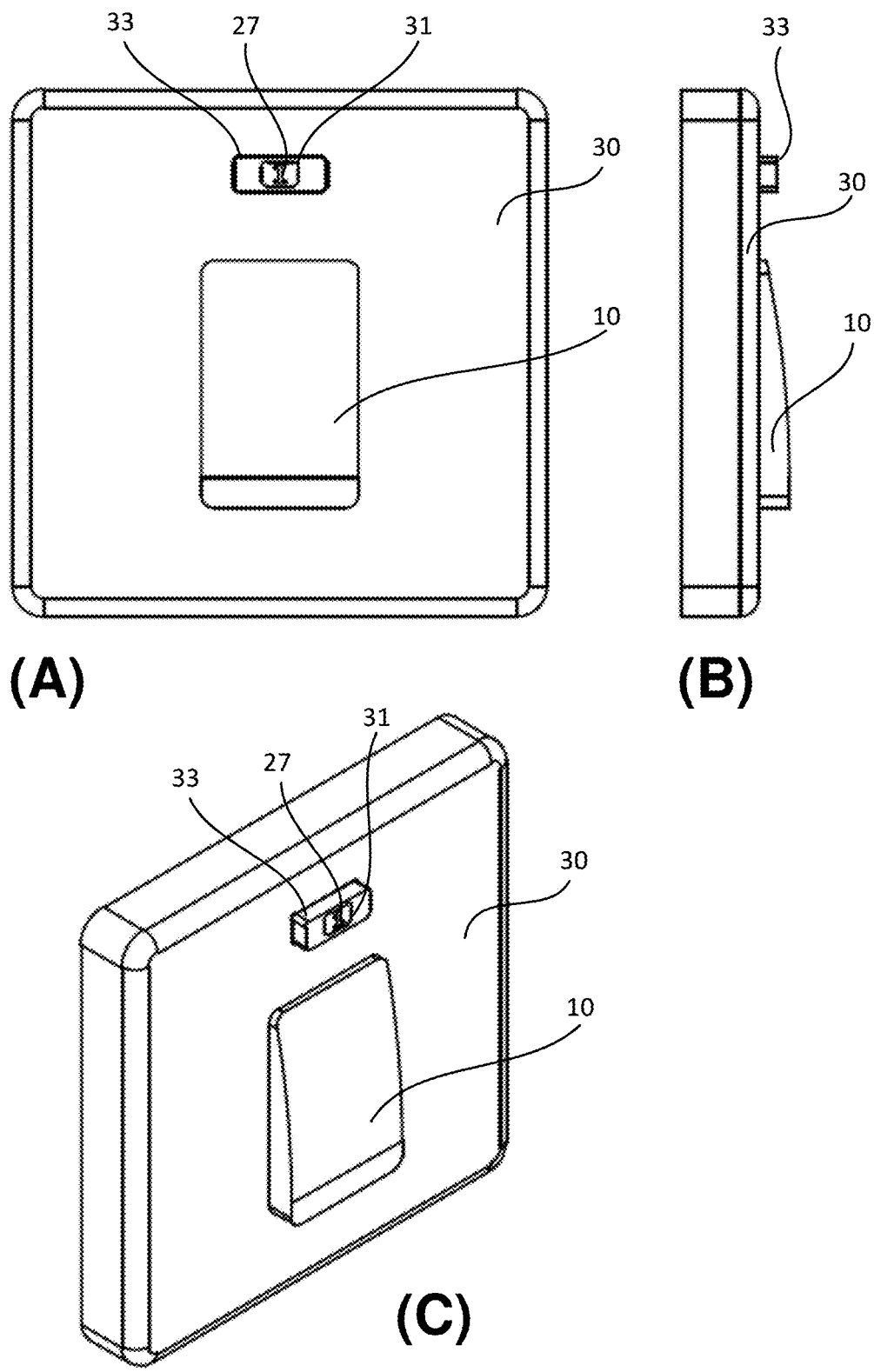
FIG. 11 shows a front view (A), a side view (B) and a perspective view (C) of an exemplary faceplate having a push button with display for selecting and showing functionality marking of the switching device according to one embodiment of the present invention.

Referring now to FIG. 11, a front view (A), a side view (B) and a perspective view (C) of an exemplary faceplate 30 having a push button with display 33 for selecting and showing functionality marking of the switching device are shown according to certain embodiments of the present invention. The push button with display 33 includes the functionality marking display window 31 on the front surface of the push button with display 33 to display the set of available symbols 27. As the user presses the push button with display 33, the set of available symbols 27 is displayed on the functionality marking display window 31. When the user sees a desired symbol to represent the switching device 10 through the functionality marking display window 31, the user presses and holds to select the desired symbol 27 to designate the switching device 10.

Referring now to FIG. 12, a front view of an exemplary faceplate 30 having an LED array and a functionality marking selection push button 37 for selecting and showing user-defined color patterns as functionality markings is shown according to one embodiment of the present invention. A functionality marking selection push button 37 is positioned next to the LED array 22 and it is used by the user to program the programmable functionality markings. Unlike many embodiments shown earlier, this embodiment includes only a few colored LED lights, and it is difficult show the graphical signs, symbols, icons of appliances, phrases, words, or even alphanumeric. But the low cost to make such a faceplate 30 of a switching device 10 still merits its existence. A simply way to overcome this disadvantage is to design a user-defined colored pattern, and user can recognize the user-defined colored pattern and identify the functionality of the switching device 10. For Example, for a bathroom that has five different appliances: a jacuzzi whirlpool, a ceiling fan, a ventilation fan, a vanity light, and an outlet for hairdryer, spatially positioned from far to near relative to the bathroom door, the user may define a user-defined colored pattern in such a way:

(1) when the faceplate 30 for the switching device 10 of the jacuzzi whirlpool is programmed, the user-defined colored pattern can be the first LED light is turned on, and all other are off;

(2) when the faceplate 30 for the switching device 10 of the ceiling fan is programmed, the user-defined colored pattern can be the second LED light is turned on, and all other are off as shown in FIG. 12;

(3) when the faceplate 30 for the switching device 10 of the ventilation fan is programmed, the user-defined colored pattern can be the third LED light is turned on, and all other are off;

(4) when the faceplate 30 for the switching device 10 of the vanity light is programmed, the user-defined colored pattern can be the fourth LED light is turned on, and all other are off; and (5) when the faceplate 30 for the switching device 10 of the outlet for hairdryer is programmed, the user-defined colored pattern can be the fifth LED light is turned on, and all other are off.

In certain embodiments, when the user programs each faceplate 30 according to the user-defined colored patterns, (a) the user presses the functionality marking selection push button 37 one time to turn on the first LED light for the faceplate 30 of the switching device 10 for the jacuzzi whirlpool, and the user holds the functionality marking selection push button 37 for about three seconds to complete the programming;

(b) the user presses the functionality marking selection push button 37 twice to turn on the second LED light for the faceplate 30 of the switching device 10 for the ceiling fan, and the user holds the functionality marking selection push button 37 for about three seconds to complete the programming;

(c) the user presses the functionality marking selection push button 37 three times to turn on the third LED light for the faceplate 30 of the switching device 10 for the ventilation fan, and the user holds the functionality marking selection push button 37 for about three seconds to complete the programming;

(d) the user presses the functionality marking selection push button 37 four times to turn on the fourth LED light for the faceplate 30 of the switching device 10 for the vanity light, and the user holds the functionality marking selection push button 37 for about three seconds to complete the programming; and (e) the user presses the functionality marking selection push button 37 five times to turn on the fifth LED light for the faceplate 30 of the switching device 10 for the outlet for hairdryer, and the user holds the functionality marking selection push button 37 for about three seconds to complete the programming.

In certain embodiments, these five programmed faceplates 30 may be installed on switching devices 10 positioned one next to the other and programmed in the way described above, and the user does not need to memorized the user-defined colored patterns. When the user gets into the bathroom at the door, he/she can easily identify the switching devices 10 by the user-defined colored patterns based on the distances of these appliances to the user. The user can avoid guessing and flipping multiple switching devices to turn on or off a specific appliance as the user desires.

Referring now to FIG. 13, a front view (A), a side view (B) and a perspective view (C) of an exemplary faceplate 30 having a pair of functionality marking selection push buttons 35 for selecting a user-defined distinctive color displayed on a multi-colored LED and showing the user-defined distinctive color as functionality marking of the switching device according to one embodiment of the present invention.

In certain embodiments, the pair of functionality marking selection push buttons 35 includes a left arrow button 351 and a right arrow button 352. The left arrow button 351 is positioned on the left side of the multi-colored LED 24, and the right arrow button 352 is positioned on the right side of the multi-colored LED 24. Unlike many embodiments shown earlier, this embodiment includes only one multi-colored LED 24, and it is difficult show the graphical signs, symbols, icons of appliances, phrases, words, or even alphanumeric. But the low cost to make such a faceplate 30 for the switching device 10 still merits its existence. A simply way to overcome this disadvantage is to design a user-defined distinctive colors, and each color represents one appliance and user can recognize the user-defined distinctive colors and identify the functionality of the switching device 10. For Example, for the bathroom that has five different appliances: the jacuzzi whirlpool, the ceiling fan, the ventilation fan, the vanity light, and the outlet for hairdryer, these faceplates 30 for these appliances can be color-coded with one distinctive color associated with each of these faceplates 30 faceplates 30 with a color associated with each appliance.

In certain embodiments, assuming the faceplate 30 has a list of 15 distinctive colors: (1) white, (2) black, (3) blue, (4) magenta, (5) purple, (6) teal, (7) cyan, (8) green, (9) yellow, (10) orange, (11) red, (12) pink, (13) Maroon, (14) brown, and (15) lime, in this order, and the user decides to use: white (1) to associate with the jacuzzi whirlpool since the jacuzzi whirlpool is white, blue (3) to associate with the ceiling fan since the ceiling fan is blue, purple (5) to associate with the ventilation fan since the frame of the ventilation fan is painted purple, yellow (9) to associate with the vanity light since the vanity light cover is yellow, and red (11) to associate with the outlet for hairdryer since the hairdryer will be very hot.

In certain embodiments, when the user starts to program a faceplate 30, the user presses both the left arrow button 351 and the right arrow button 352 and holds for about 10 seconds to initiate the programming process. At the start, the default color (1) white is shown. The user presses briefly the left arrow button 351 to move down the list of the set of user-defined distinctive colors to change the color one press at a time from (15) through (1). The user presses briefly the right arrow button 352 to move up the list of the set of user-defined distinctive colors to change the color one press at a time from (1) through (15).

In certain embodiments, when the user programs each faceplate 30 according to the user-defined distinctive colors, (a) at the start, the default color white (1) is displayed, since the user uses white (1) to associate with the jacuzzi whirlpool, the user does not need to change the color. The user presses both the left arrow button 351 and the right arrow button 352 and holds for about 3 seconds to complete the programming;

(b) at the start, the default color white (1) is displayed, since the user uses blue (3) to associate with the ceiling fan, the user presses the right arrow button 352 briefly twice to change the current color to blue (3). Then the user presses both the left arrow button 351 and the right arrow button 352 and holds for about 3 seconds to complete the programming;

(c) at the start, the default color white (1) is displayed, since the user uses purple (5) to associate with the ventilation fan, the user presses the right arrow button 352 briefly four times to change the current color to purple (5). Then the user presses both the left arrow button 351 and the right arrow button 352 and holds for about 3 seconds to complete the programming;

(d) at the start, the default color white (1) is displayed, since the user uses yellow (9) to associate with the vanity light, the user presses the left arrow button 351 briefly seven times to change the current color to yellow (9). Then the user presses both the left arrow button 351 and the right arrow button 352 and holds for about 3 seconds to complete the programming; and (e) at the start, the default color white (1) is displayed, since the user uses red (11) to associate with the outlet for hairdryer, the user presses the left arrow button 351 briefly five times to change the current color to red (11). Then the user presses both the left arrow button 351 and the right arrow button 352 and holds for about 3 seconds to complete the programming.

Referring now to FIG. 14, a front view of an exemplary faceplate 30 having a functionality marking programmer button 41 for selecting a user-defined distinctive color displayed on a multi-colored LED 24 and the multi-colored LED 24 showing the user-defined distinctive color as functionality marking of the switching device 10 is shown according to one embodiment of the present invention. In this embodiment, the functionality marking programmer button 41 is placed on the outside surface 301 of the faceplate 30 beside the multi-color LED 24. This functionality marking programmer button 41 is equivalent to the right arrow button 352. Each time the user presses the functionality marking programmer button 41 to move up the list of the set of user-defined distinctive colors from white (1) through lime (15).

In certain embodiments, when the user programs each faceplate 30 according to the user-defined colored patterns (a) at the start, the default color white (1) is displayed, since the user uses white (1) to associate with the jacuzzi whirlpool, the user does not need to change the color. The user presses and holds the functionality marking programmer button 41 for about 3 seconds to complete the programming;

(b) at the start, the default color white (1) is displayed, since the user uses blue (3) to associate with the ceiling fan, the user presses the functionality marking programmer button 41 briefly twice to change the current color to blue (3). The user presses and holds the functionality marking programmer button 41 for about 3 seconds to complete the programming;

(c) at the start, the default color white (1) is displayed, since the user uses purple (5) to associate with the ventilation fan, the user presses the functionality marking programmer button 41 briefly four times to change the current color to purple (5). The user presses and holds the functionality marking programmer button 41 for about 3 seconds to complete the programming;

(d) at the start, the default color white (1) is displayed, since the user uses yellow (9) to associate with the vanity light, the user presses the functionality marking programmer button 41 briefly eight times to change the current color to yellow (9). The user presses and holds the functionality marking programmer button 41 for about 3 seconds to complete the programming; and (e) at the start, the default color white (1) is displayed, since the user uses red (11) to associate with the outlet for hairdryer, the user presses the functionality marking programmer button 41 briefly ten times to change the current color to red (11). Then the user presses the functionality marking programmer button 41 and holds for about 3 seconds to complete the programming.

In certain embodiments, the switching device 10 includes at least one of: a toggle switch, a rotary switch, a push button switch, a touch switch, a push switch, a pull switch, a rocker switch, a slide switch, a light sensing switch, a motion sensing switch, and an LCD touchscreen switch.

In another aspect, the present disclosure relates to a method of using a faceplate 30 having programmable functionality markings for a switching device 10. In certain embodiments, the method includes:

installing, by a user, the faceplate 30 having programmable functionality markings on the switching device 10;

receiving, from the user through a functionality marking input interface 46, functionality marking programming instructions;

designating, by a functionality marking programmer, one of a plurality of functionality markings to the switching device 10 according to the functionality marking programming instructions received from the functionality marking input interface 46; and displaying, by a functionality marking display 20 on the faceplate 30, the programmed functionality marking of the switching device 10.

Figure 15:
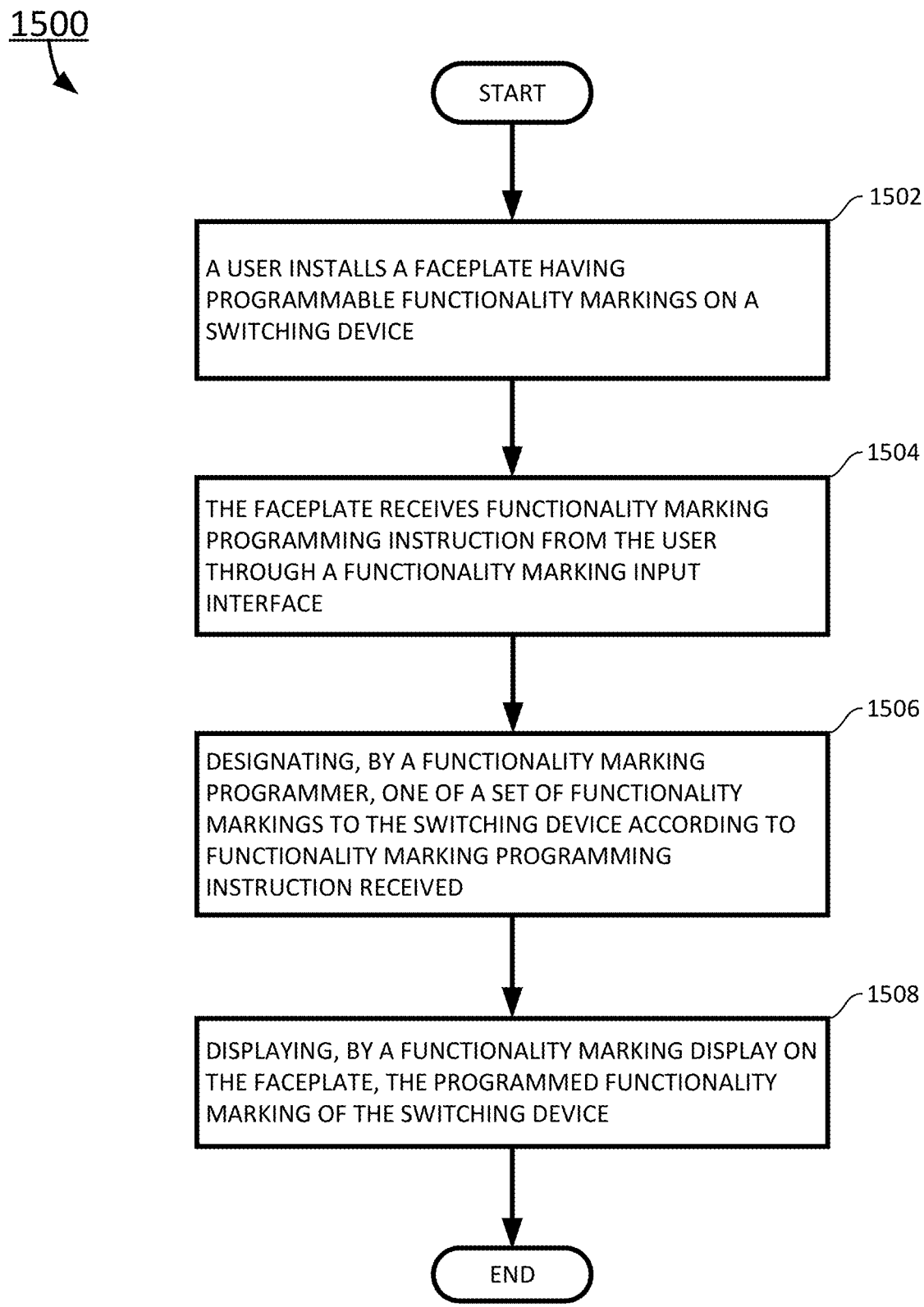
FIG. 15 shows a flowchart of a method of using the faceplate having programmable functionality markings for the switching device according to certain embodiments of the present disclosure.

Referring now to FIG. 15, a flowchart of the method 1500 of using the faceplate 30 having programmable functionality markings for the switching device 10 is shown according to certain embodiments of the present disclosure.

At block 1502, a user installs the faceplate 30 having programmable functionality markings on the switching device 10. In certain embodiments, the faceplate 30 includes an outside surface 301, and an inside surface 302. A circuit board 32 is installed directly on the inside surface 302 of the faceplate 30. As shown in FIG. 2, the faceplate 30 includes a functionality marking programmer 40, a functionality marking input interface 46 and a functionality marking display 20. In certain embodiments, the circuit board 32 includes a control module 34. The control module 34 includes a processor 36 and a non-volatile memory 38 storing an operating system 382 and computer executable instructions 384. The control module 34 is electrically coupled to the functionality marking programmer 40 for receiving the functionality marking programming instructions. The control module 34 is also electrically coupled to the functionality marking display 20 for displaying the programmed functionality marking.

At block 1504, the control module 34 of the faceplate 30 receives functionality marking programming instructions from the user through the functionality marking input interface 46. The functionality marking programming instructions inform the control module 34 of the faceplate 30 that the user has select one of a set of signs, symbols, or icons of appliance to designate the switching device 10.

At block 1506, the functionality marking programmer 40 designates one of the set of signs, symbols, or icons of appliance to the switching device 10 according to the functionality marking programming instructions received.

At block 1508, once the functionality marking of the faceplate 30 is selected, the selected functionality marking is transmitted to the functionality marking display 20 and the functionality marking display 20 displays the selected functionality marking on the faceplate 30 of the switching device 10.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A faceplate having programmable functionality markings for a switching device, comprises:

an outside surface, and an inside surface, wherein a circuit board is installed directly on the inside surface of the faceplate;

a functionality marking programmer, wherein a user uses the functionality marking programmer to designate the switching device to a specific functionality with a corresponding functionality marking according to functionality marking programming instructions received from a functionality marking input interface, wherein the functionality marking programmer comprise:

a functionality marking programming device having an application built-in, wherein the user uses the functionality marking programming device to select one of a plurality of signs displayed on a display screen of the functionality marking programming device, and sends functionality marking programming instructions over a connection to the functionality marking input interface of the faceplate to designate the switching device to one of the plurality of functionality markings;

a functionality marking selection icon inside of a touch screen, wherein the user touches the functionality marking selection icon to cycle though the plurality of signs, to select one of the plurality of signs displayed on the touch screen, and sends functionality marking programming instructions to a control module of the faceplate to designate the switching device to one of the plurality of functionality markings;

a functionality marking programmer button on the faceplate, wherein the user presses the functionality marking programmer button to cycle though the plurality of signs, to select one of the plurality of signs displayed on the touch screen, and sends functionality marking programming instructions to the control module of the faceplate to designate the switching device to one of the plurality of functionality markings;

a dial, wherein as the user turns the dial, a plurality of symbols is displayed on a functionality marking display, and the user selects one of the plurality of symbols to designate the switching device;

a push button with display having the functionality marking display, wherein the user pushes the push button with display repeatedly to cycle though the plurality of signs, selects one of the plurality of signs displayed on the functionality marking display, and sends functionality marking programming instructions to the control module of the faceplate to designate the switching device to one of the plurality of functionality markings;

a functionality marking selection push button on the faceplate having the LED array, wherein the user pushes the functionality marking selection push button repeatedly to cycle though a plurality of user-defined colored patterns, selects one of the plurality of user-defined colored patterns displayed on the functionality marking display, and sends functionality marking programming instructions to the control module of the faceplate to designate the switching device to one of the plurality of functionality markings; and a pair of functionality marking selection push buttons on the faceplate having the multi-color LED, wherein the user pushes a left arrow button to move down a list of a plurality of user-defined distinctive colors and pushes a right arrow button to move up the list of the plurality of user-defined distinctive colors, selects one of the plurality of user-defined distinctive colors displayed on the multi-color LED, and sends functionality marking programming instructions to the control module of the faceplate to designate the switching device to one of the plurality of functionality markings;

the functionality marking display installed on the outside surface of the faceplate, wherein the functionality marking display displays one of the plurality of functionality markings of the switching device programmed by the functionality marking programmer; and the control module having a processor and a non-volatile memory storing an operating system and computer executable instructions, when executed at the processor, the computer executable instructions cause the processor to:

receive the functionality marking programming instructions from the user via the functionality marking input interface;

designate the functionality of the switching device with the functionality marking according to the functionality marking programming instructions received from the functionality marking input interface; and display the programmed functionality marking of the switching device via the functionality marking display.

2. The faceplate for the switching device according to claim 1, wherein the circuit board comprises the control module, and the control module comprises the processor, and the non-volatile memory.

3. The faceplate for the switching device according to claim 2, wherein the control module is electrically coupled to the functionality marking programmer for receiving the functionality marking programming instructions, and the functionality marking display for displaying the programmed functionality marking.

4. The faceplate for the switching device according to claim 3, wherein the plurality of functionality markings comprises at least one of:

the plurality of signs shown on a display screen, wherein each of the plurality of signs represents one of the plurality of functionality markings;

the plurality of symbols shown on the dial, wherein each of the plurality of symbols represents one of the plurality of functionality markings;

the plurality of user-defined color patterns shown on a light emitting diode (LED) array, wherein each of the plurality of user-defined color patterns represents one of the plurality of functionality markings; and the plurality of user-defined distinctive colors shown on a multi-color LED, wherein each of the plurality of user-defined distinctive colors represents one of the plurality of functionality markings.

5. The faceplate for the switching device according to claim 4, wherein the plurality of signs comprises graphical signs of appliances, icons, alphanumerical phrases, words, and numbers.

6. The faceplate for the switching device according to claim 5, wherein the plurality of symbols comprises graphical symbols of appliances, alphanumerical phrases, words, and numbers.

7. The faceplate for the switching device according to claim 6, wherein the functionality marking display comprises at least one of:

the display screen, wherein the display screen comprises at least one of an LED display screen, a liquid crystal display (LCD) screen, and an LED touchscreen display, and a LCD touchscreen display, the display screen displays the plurality of signs, and each of the plurality of signs represents one of the plurality of functionality markings;

the dial, wherein the dial comprises the plurality of symbols, the dial displays the plurality of symbols and each of the plurality of symbols represents one of the plurality of functionality markings;

the LED array, wherein the LED array displays a plurality of user-defined colored patterns, and each of the user-defined colored patterns represents one of the plurality of functionality markings; and the multi-color LED, wherein the multi-color LED displays the plurality of user-defined distinctive colors, and each of the user-defined distinctive colors represents one of the plurality of functionality markings.

8. The faceplate for the switching device according to claim 1, wherein the connection between the functionality marking programming device and the functionality marking input interface comprises:

a wireless connection between the functionality marking programming device and the functionality marking input interface over a communication network, wherein the communication network comprises at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network; and a wired connection between the functionality marking programming device and the functionality marking input interface directly through a connecting cable.

9. The faceplate for the switching device according to claim 1, wherein the switching device comprises at least one of:

a toggle switch;
a rotary switch;
a push button switch;
a touch switch;
a push switch;
a pull switch;
a rocker switch;
a slide switch;
a light sensing switch;

a motion sensing switch; and
an LCD touchscreen switch.

10. A method of using a faceplate having programmable functionality markings for a switching device, comprising:
installing, by a user, the faceplate having programmable functionality markings on the switching device;
receiving, from the user through a functionality marking input interface, functionality marking programming instructions;
designating, by a functionality marking programmer, one of a plurality of functionality markings to the switching device according to the functionality marking programming instructions received from the functionality marking input interface wherein the functionality marking programmer comprise:
  a functionality marking programming device having an application built-in, wherein the user uses the functionality marking programming device to select one of a plurality of signs displayed on a display screen of the functionality marking programming device, and sends functionality marking programming instructions over a connection to the functionality marking input interface of the faceplate to designate the switching device to one of the plurality of functionality markings;
  a functionality marking selection icon inside of a touch screen, wherein the user touches the functionality marking selection icon to cycle though the plurality of signs, to select one of the plurality of signs displayed on the touch screen, and sends functionality marking programming instructions to a control module of the faceplate to designate the switching device to one of the plurality of functionality markings;
  a functionality marking programmer button on the faceplate, wherein the user presses the functionality marking programmer button to cycle though the plurality of signs, to select one of the plurality of signs displayed on the touch screen, and sends functionality marking programming instructions to the control module of the faceplate to designate the switching device to one of the plurality of functionality markings;
  a dial, wherein as the user turns the dial, a plurality of symbols is displayed on a functionality marking display, and the user selects one of the plurality of symbols to designate the switching device;
  a push button with display having the functionality marking display, wherein the user pushes the push button with display repeatedly to cycle though the plurality of signs, selects one of the plurality of signs displayed on the functionality marking display, and sends functionality marking programming instructions to the control module of the faceplate to designate the switching device to one of the plurality of functionality markings;
  a functionality marking selection push button on the faceplate having the LED array, wherein the user pushes the functionality marking selection push button repeatedly to cycle though a plurality of user-defined colored patterns, selects one of the plurality of user-defined colored patterns displayed on the functionality marking display, and sends functionality marking programming instructions to the control module of the faceplate to designate the switching device to one of the plurality of functionality markings; and
  a pair of functionality marking selection push buttons on the faceplate having the multi-color LED, wherein the user pushes a left arrow button to move down a list of the plurality of user-defined distinctive colors and pushes a right arrow button to move up the list of the plurality of user-defined distinctive colors, selects one of the plurality of user-defined distinctive colors displayed on the multi-color LED, and sends functionality marking programming instructions to the control module of the faceplate to designate the switching device to one of the plurality of functionality markings; and
displaying, by the functionality marking display on the faceplate, the programmed functionality marking of the switching device.

11. The method according to claim 10, wherein the faceplate for the switching device comprises:
an outside surface, and an inside surface, wherein a circuit board is installed directly on the inside surface of the faceplate;
the functionality marking programmer, wherein the user uses the functionality marking programmer to designate the switching device to a specific functionality with a corresponding functionality marking according to functionality marking programming instructions received from the functionality marking input interface;
the functionality marking display installed on the outside surface of the faceplate, wherein the functionality marking display displays one of the plurality of functionality markings of the switching device programmed by the functionality marking programmer; and
the control module having a processor and a non-volatile memory storing an operating system and computer executable instructions, when executed at the processor, the computer executable instructions cause the processor to:
  receive the functionality marking programming instructions from the user via the functionality marking input interface;
  designate the functionality of the switching device with the functionality marking according to the functionality marking programming instructions received from the functionality marking input interface; and
  display the programmed functionality marking of the switching device via the functionality marking display.

12. The method according to claim 11, wherein the circuit board comprises the control module, and the control module comprises the processor, and the non-volatile memory.

13. The method according to claim 11, wherein the control module is electrically coupled to the functionality marking programmer for receiving the functionality marking programming instructions, and the functionality marking display for displaying the programmed functionality marking.

14. The method according to claim 11, wherein the plurality of functionality markings comprises at least one of:
the plurality of signs shown on a display screen, wherein each of the plurality of signs represents one of the plurality of functionality markings;
the plurality of symbols shown on the dial, wherein each of the plurality of symbols represents one of the plurality of functionality markings;
the plurality of user-defined color patterns shown on a light emitting diode (LED) array, wherein each of the plurality of user-defined color patterns represents one of the plurality of functionality markings; and the plurality of user-defined distinctive colors shown on a multi-color LED, wherein each of the plurality of user-defined distinctive colors represents one of the plurality of functionality markings.

15. The method according to claim 14, wherein the plurality of signs comprises graphical signs of appliances, icons, alphanumerical phrases, words, and numbers.

16. The method according to claim 15, wherein the plurality of symbols comprises graphical symbols of appliances, alphanumerical phrases, words, and numbers.

17. The method according to claim 16, wherein the functionality marking display comprises at least one of:
- the display screen, wherein the display screen comprises at least one of an LED display screen, a liquid crystal display (LCD) screen, and an LED touchscreen display, and a LCD touchscreen display, the display screen displays the plurality of signs, and each of the plurality of signs represents one of the plurality of functionality markings;
- the dial, wherein the dial comprises the plurality of symbols, the dial displays the plurality of symbols and each of the plurality of symbols represents one of the plurality of functionality markings;
- the LED array, wherein the LED array displays a plurality of user-defined colored patterns, and each of the plurality of user-defined colored patterns represents one of the plurality of functionality markings; and
- the multi-color LED, wherein the multi-color LED displays the plurality of user- defined distinctive colors, and each of the plurality of user-defined distinctive colors represents one of the plurality of functionality markings.

18. The method according to claim 10, wherein the connection between the functionality marking programming device and the functionality marking input interface comprises:
- a wireless connection between the functionality marking programming device and the functionality marking input interface over a communication network, wherein the communication network comprises at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network; and
- a wired connection between the functionality marking programming device and the functionality marking input interface directly through a connecting cable.

* * * * *